(12) United States Patent
Matsumoto

(10) Patent No.: US 11,025,789 B2
(45) Date of Patent: Jun. 1, 2021

(54) ORDERING SYSTEM, ORDERING SERVER APPARATUS, AND NON-VOLATILE COMPUTER READABLE RECORDING MEDIUM

(71) Applicant: KYOCERA DOCUMENT SOLUTIONS INC., Osaka (JP)

(72) Inventor: Atsushi Matsumoto, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/726,644

(22) Filed: Dec. 24, 2019

(65) Prior Publication Data

US 2020/0213456 A1    Jul. 2, 2020

(30) Foreign Application Priority Data

Dec. 28, 2018    (JP) .............................. JP2018-247156

(51) Int. Cl.
*H04N 1/00* (2006.01)
*G06F 3/12* (2006.01)

(52) U.S. Cl.
CPC ....... *H04N 1/00344* (2013.01); *G06F 3/1219* (2013.01); *G06F 3/1224* (2013.01)

(58) Field of Classification Search
CPC . H04N 1/00344; G06F 3/1224; G06F 3/1219; G06Q 10/087; G06Q 30/06
USPC ...................................................... 358/1.14
See application file for complete search history.

(56) References Cited

U.S. PATENT DOCUMENTS

| 9,573,807 B1* | 2/2017 | Kaufman | G01R 33/093 |
| 2002/0073130 A1* | 6/2002 | Haines | G06Q 10/107 |
| | | | 718/102 |
| 2015/0138583 A1* | 5/2015 | Miyahara | H04N 1/00832 |
| | | | 358/1.13 |

FOREIGN PATENT DOCUMENTS

| JP | H06149851 A | 5/1994 |
| JP | 2001034685 A | 2/2001 |
| JP | 2003330695 A | 11/2003 |
| JP | 2006215401 A | 8/2006 |

* cited by examiner

*Primary Examiner* — Miya J Williams
*Assistant Examiner* — Darryl V Dottin
(74) *Attorney, Agent, or Firm* — Li & Cai Intellectual Property (USA) Office

(57) ABSTRACT

An ordering server apparatus includes a controller circuit configured to receive remaining amount information from an image forming apparatus, determine to order a consumable product to be used in the image forming apparatus on a basis of the remaining amount information, obtain image forming apparatus location information, the image forming apparatus location information indicating location information of the image forming apparatus, obtain stock manager server location information, the stock manager server location information indicating location information of each of one or more stock manager server apparatuses, determine, on a basis of the image forming apparatus location information and the stock manager server location information, one stock manager server apparatus having a smallest distance from the image forming apparatus, and send, to the determined stock manager server apparatus, an order request to order the consumable product.

8 Claims, 17 Drawing Sheets

ORDERING SYSTEM, ORDERING SERVER APPARATUS, AND NON-VOLATILE COMPUTER READABLE RECORDING MEDIUM

CROSS-REFERENCE TO RELATED PATENT APPLICATION

This application claims the benefit of Japanese Priority Patent Application JP 2018-247156 filed Dec. 28, 2018, the entire contents of which are incorporated herein by reference.

FIELD OF THE DISCLOSURE

The present disclosure relates to an ordering system including an image forming apparatus using a consumable product, an ordering server apparatus communicatively connected to the image forming apparatus, and one or more stock manager server apparatuses communicatively connected to the ordering server apparatus.

BACKGROUND OF THE DISCLOSURE

An image forming apparatus uses a consumable product (for example, toner).

SUMMARY OF THE DISCLOSURE

User-friendliness is desired when a user orders a consumable product (for example, toner) to be used in an image forming apparatus.

According to an embodiment of the present disclosure, there is provided an ordering system, including:
an image forming apparatus using a consumable product;
an ordering server apparatus communicatively connected to the image forming apparatus; and
one or more stock manager server apparatuses communicatively connected to the ordering server apparatus,
the image forming apparatus being configured to
send remaining amount information to the ordering server apparatus, the remaining amount information indicating a remaining amount of a consumable product in use in the image forming apparatus,
the ordering server apparatus being configured to
receive the remaining amount information from the image forming apparatus,
determine to order a consumable product to be used in the image forming apparatus on a basis of the remaining amount information,
obtain image forming apparatus location information, the image forming apparatus location information indicating location information of the image forming apparatus,
obtain stock manager server location information, the stock manager server location information indicating location information of each of the one or more stock manager server apparatuses,
determine, on a basis of the image forming apparatus location information and the stock manager server location information, one stock manager server apparatus having a smallest distance from the image forming apparatus, and
send, to the determined stock manager server apparatus, an order request to order the consumable product.

According to an embodiment of the present disclosure, there is provided an ordering server apparatus, including:
a controller circuit configured to
receive remaining amount information from an image forming apparatus, the image forming apparatus using a consumable product, the remaining amount information indicating a remaining amount of the consumable product in use in the image forming apparatus,
determine to order a consumable product to be used in the image forming apparatus on a basis of the remaining amount information,
obtain image forming apparatus location information, the image forming apparatus location information indicating location information of the image forming apparatus,
obtain stock manager server location information, the stock manager server location information indicating location information of each of one or more stock manager server apparatuses,
determine, on a basis of the image forming apparatus location information and the stock manager server location information, one stock manager server apparatus having a smallest distance from the image forming apparatus, and
send, to the determined stock manager server apparatus, an order request to order the consumable product.

According to an embodiment of the present disclosure, there is provided a non-volatile computer readable recording medium that records an information processing program executable by a controller circuit of an ordering server apparatus,
the information processing program causing the controller circuit of the image forming apparatus to
receive remaining amount information from an image forming apparatus, the image forming apparatus using a consumable product, the remaining amount information indicating a remaining amount of the consumable product in use in the image forming apparatus,
determine to order a consumable product to be used in the image forming apparatus on a basis of the remaining amount information,
obtain image forming apparatus location information, the image forming apparatus location information indicating location information of the image forming apparatus,
obtain stock manager server location information, the stock manager server location information indicating location information of each of one or more stock manager server apparatuses,
determine, on a basis of the image forming apparatus location information and the stock manager server location information, one stock manager server apparatus having a smallest distance from the image forming apparatus, and
send, to the determined stock manager server apparatus, an order request to order the consumable product.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Ordering System

Figure 1:
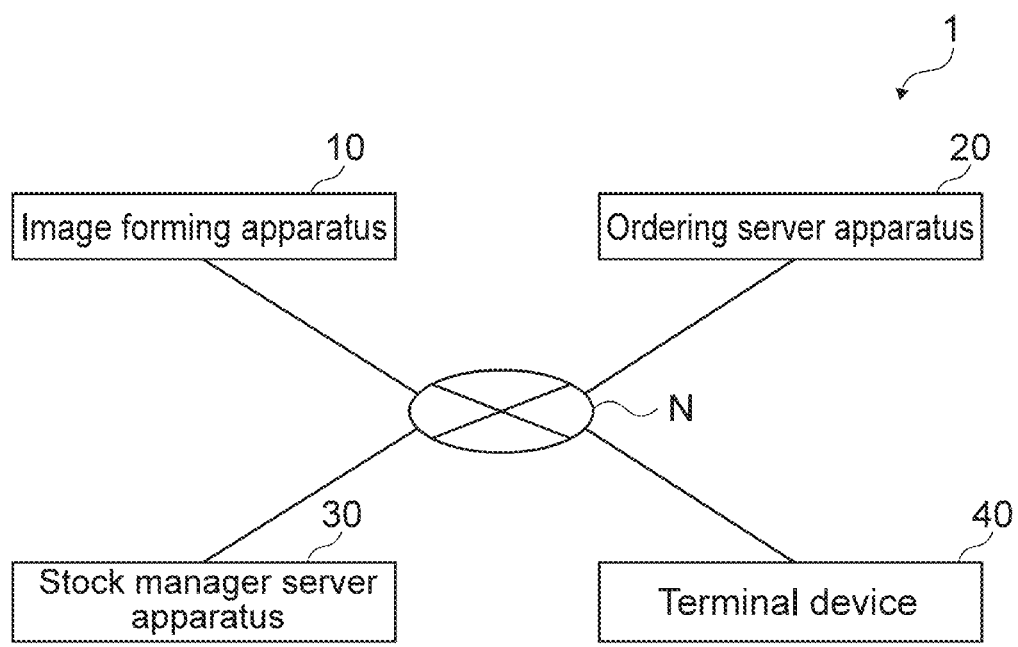
FIG. 1 schematically shows an ordering system according to an embodiment of the present disclosure.

FIG. 1 schematically shows an ordering system according to an embodiment of the present disclosure.

The ordering system 1 includes the image forming apparatus 10, the ordering server apparatus 20, the one or more stock manager server apparatuses 30, and the terminal device 40. The image forming apparatus 10, the ordering server apparatus 20, the one or more stock manager server apparatuses 30, and the terminal device 40 are connected to the network N including the Internet. Hereinafter, unless otherwise necessary to distinguish between the one or more stock manager server apparatuses 30, only one stock manager server apparatus 30 will be shown and described.

The image forming apparatus 10 is, for example, an MFP (Multifunction Peripheral). The image forming apparatus 10 uses a consumable product. In the present embodiment, the "consumable product" is a toner.

The ordering server apparatus 20 sends an order request to the stock manager server apparatus 30 depending on the remaining amount of the consumable product in use in the image forming apparatus 10. The order request is a request for ordering a consumable product to be used in the image forming apparatus 10.

A distributor (seller) that distributes the consumable products uses the stock manager server apparatus 30. The stock manager server apparatus 30 receives the order request from the ordering server apparatus 20, sends a shipment request to the terminal device 40, and manages the stock of the consumable products.

A worker in a site (warehouse, etc.), from which the consumable products are shipped, uses the terminal device 40. The terminal device 40 receives the shipment request from the stock manager server apparatus 30. The worker physically ships a consumable product according to the received shipment request. Typically, the terminal device 40 is a mobile device such as a smartphone or a tablet computer, or may be an un-mobile device such as a personal computer.

2. Hardware Configuration of Image Forming Apparatus

Figure 2:
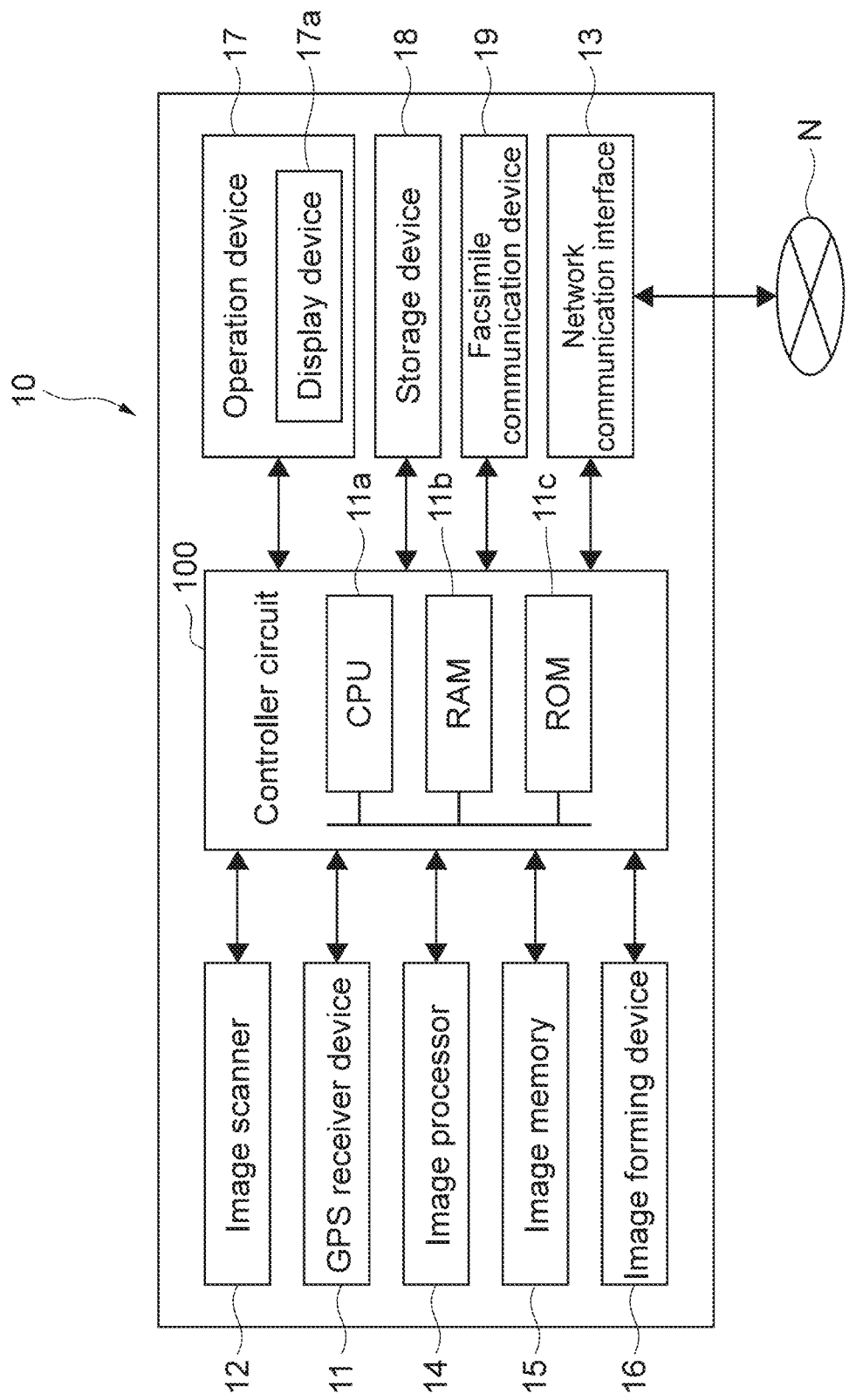
FIG. 2 shows a hardware configuration of an image forming apparatus.

FIG. 2 shows a hardware configuration of an image forming apparatus.

The image forming apparatus 10 includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs stored in the ROM 11c in the RAM 11b and executes the information processing programs. The ROM 11c is a nonvolatile memory that stores programs executed by the CPU 11a, data, and the like. The ROM 11c is an example of a non-transitory computer readable recording medium.

The controller circuit 100 is connected to the GPS (Global Positioning System) receiver device 11, the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

3. Hardware Configuration of Ordering Server Apparatus

Figure 3:
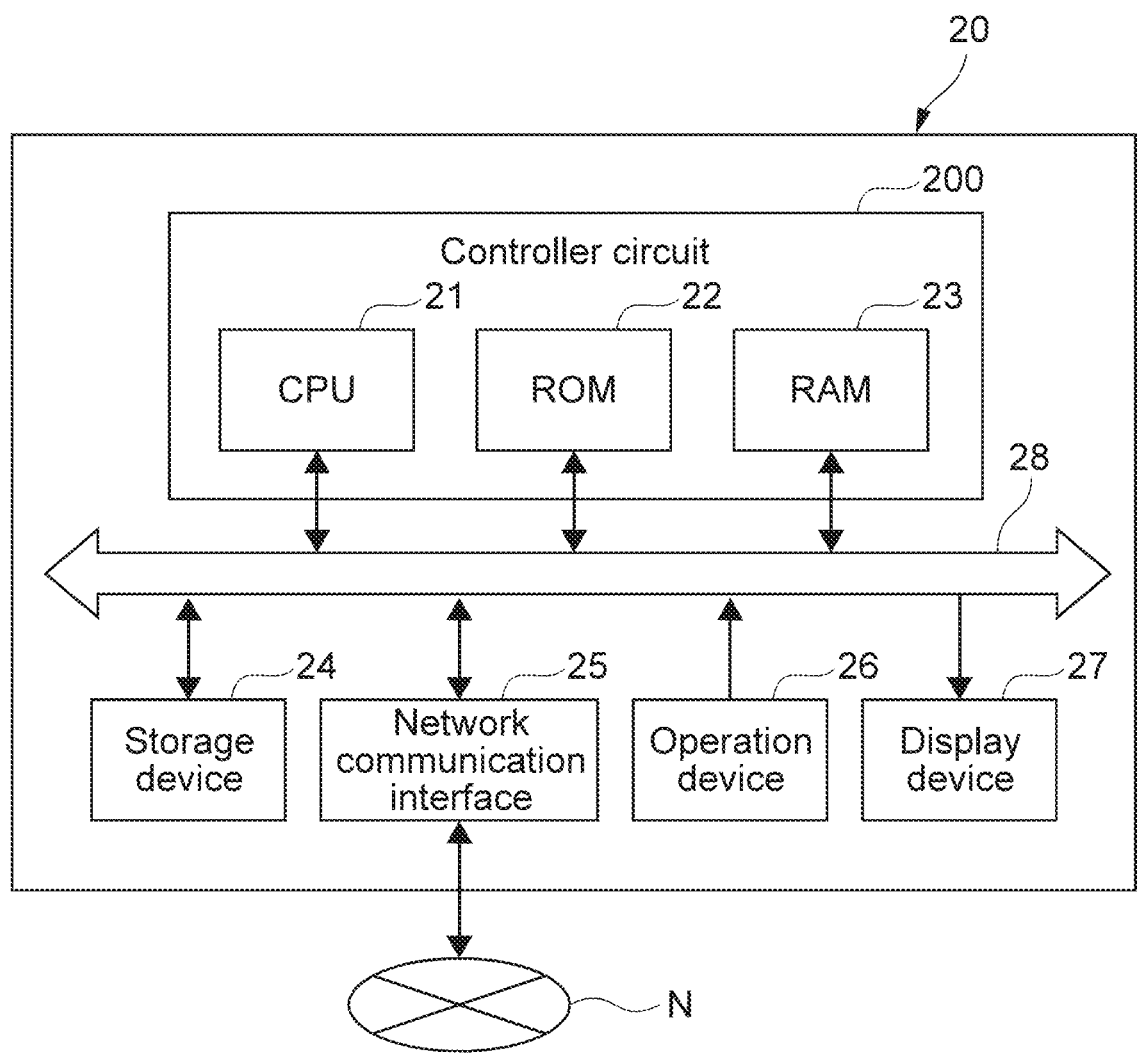
FIG. 3 shows a hardware configuration of an ordering server apparatus.

FIG. 3 shows a hardware configuration of an ordering server apparatus.

The ordering server apparatus 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

4. Hardware Configuration of Stock Manager Server Apparatus

Figure 4:
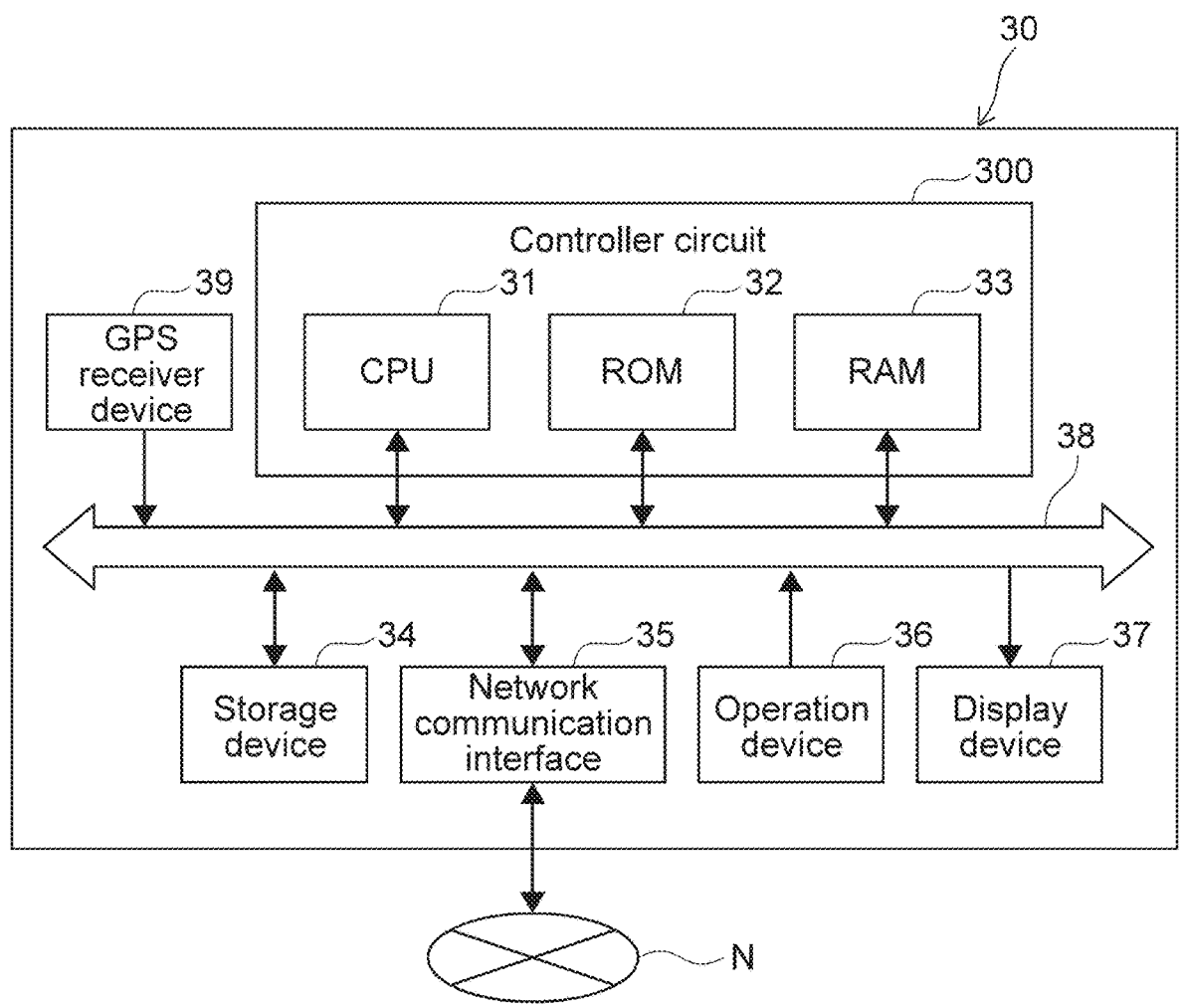
FIG. 4 shows a hardware configuration of a stock manager server apparatus.

FIG. 4 shows a hardware configuration of a stock manager server apparatus.

The stock manager server apparatus 30 includes the CPU 31, the ROM 32, the RAM 33, the storage device 34, which is a large-volume nonvolatile memory such as an SSD, the network communication interface 35, the operation device 36 and the display device 37 (touch panel), and the GPS receiver device 39, and the bus 38 connecting them to each other. The operation device 36 is one mode of an input device. A sound input device including a microphone may be provided as an input device.

The controller circuit 300 includes the CPU 31, the ROM 32, and the RAM 33. The CPU 31 loads information processing programs stored in the ROM 32 in the RAM 33 and executes the information processing programs. The ROM 32 stores programs executed by the CPU 31, data, and the like nonvolatile. The ROM 32 is an example of a non-transitory computer readable recording medium.

5. Hardware Configuration of Terminal Device

Figure 5:
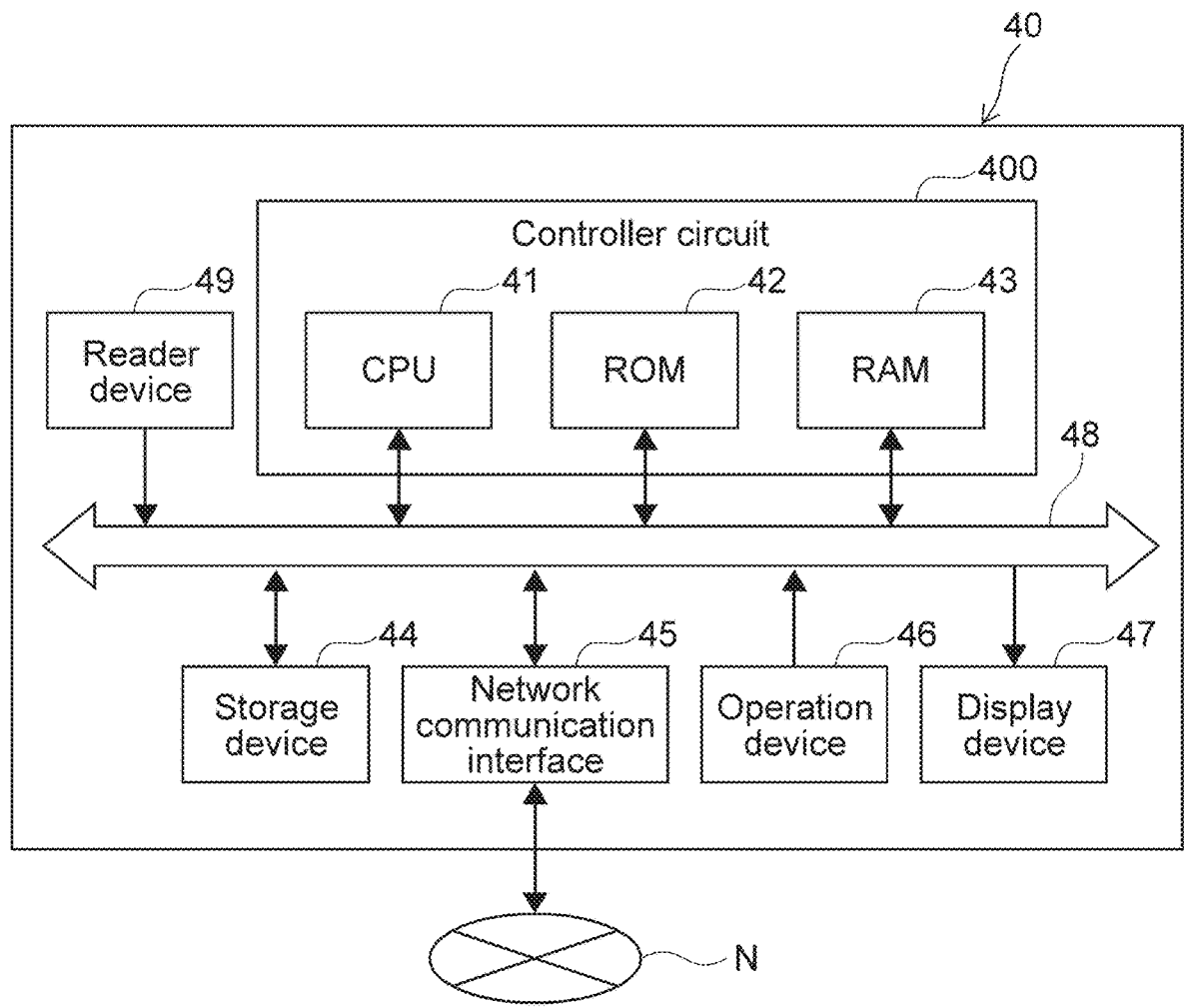
FIG. 5 shows a hardware configuration of a terminal device.

FIG. 5 shows a hardware configuration of a terminal device.

The terminal device 40 includes the CPU 41, the ROM 42, the RAM 43, the storage device 44, which is a large-volume nonvolatile memory such as an HDD or an SSD, the network communication interface 45, the operation device 46, the display device 47, and the reader device 49 (image pickup device such as a camera), and the bus 48 connecting them to each other. The operation device 46 is one mode of an input device. A sound input device including a microphone may be provided as an input device.

The controller circuit 400 includes the CPU 41, the ROM 42, and the RAM 43. The CPU 41 loads information processing programs stored in the ROM 42 in the RAM 43 and executes the information processing programs. The ROM 42 stores programs executed by the CPU 41, data, and the like nonvolatile. The ROM 42 is an example of a non-transitory computer readable recording medium.

6. Functional Configuration of Ordering System

Figure 6:
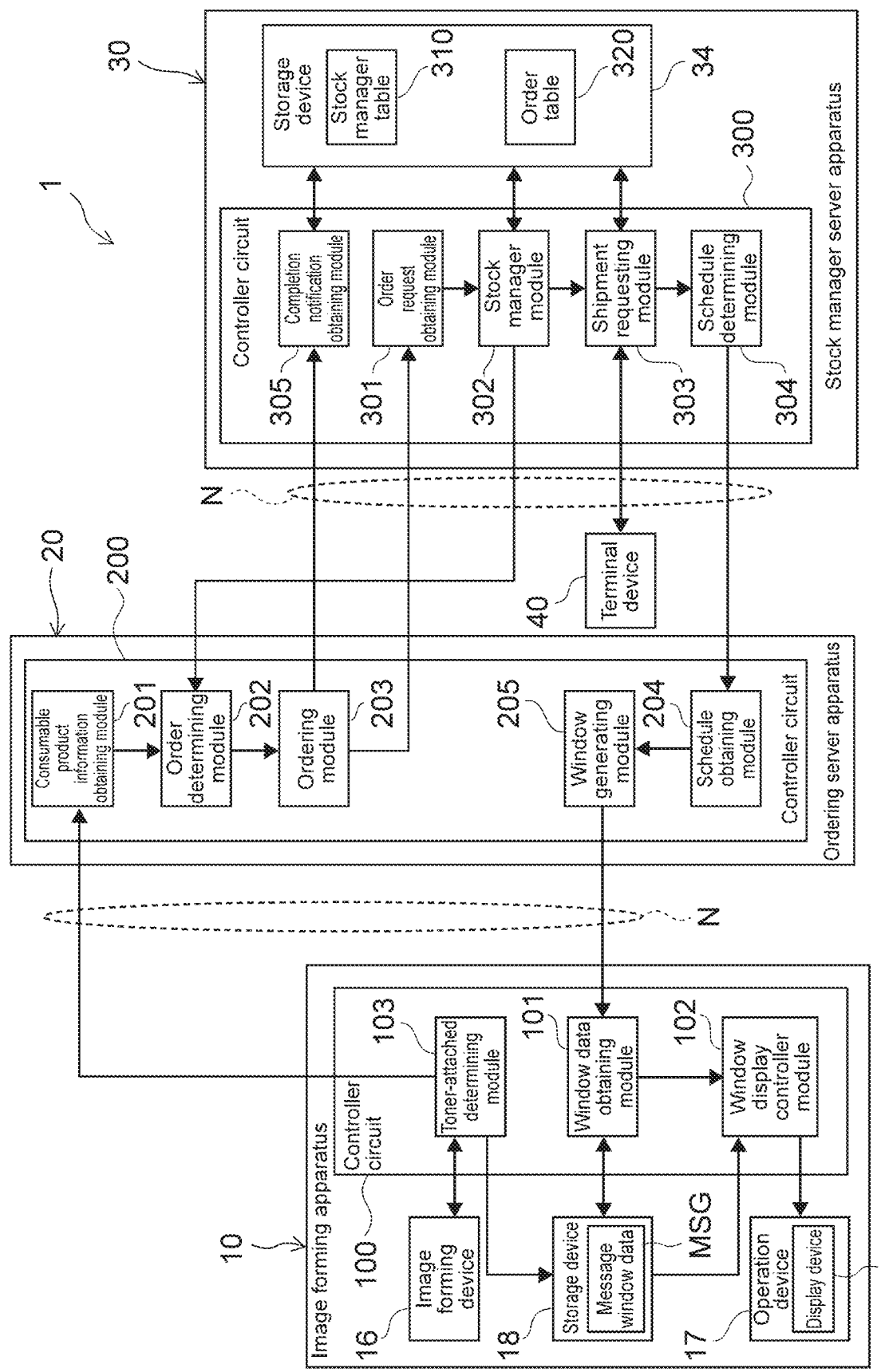
FIG. 6 shows a functional configuration of the ordering system.

FIG. 6 shows a functional configuration of the ordering system.

In the image forming apparatus 10, in the controller circuit 100, the CPU 11a loads an information processing program stored in the ROM 11c in the RAM 11b and executes the information processing program to operate as the window data obtaining module 101, the window display controller module 102, and the toner-attached determining module 103.

In the ordering server apparatus 20, in the controller circuit 200, the CPU 21 loads an information processing program stored in the ROM 22 in the RAM 23 and executes the information processing program to operate as the consumable product information obtaining module 201, the order determining module 202, the ordering module 203, the schedule obtaining module 204, and the window generating module 205.

In the stock manager server apparatus 30, in the controller circuit 300, the CPU 31 loads an information processing program stored in the ROM 32 in the RAM 33 and executes the information processing program to operate as the order request obtaining module 301, the stock manager module 302, the shipment requesting module 303, the schedule determining module 304, and the completion notification obtaining module 305. The storage device 34 of the stock manager server apparatus 30 stores the stock manager table 310 and the order table 320.

7. Operation of Ordering System

Figure 12:
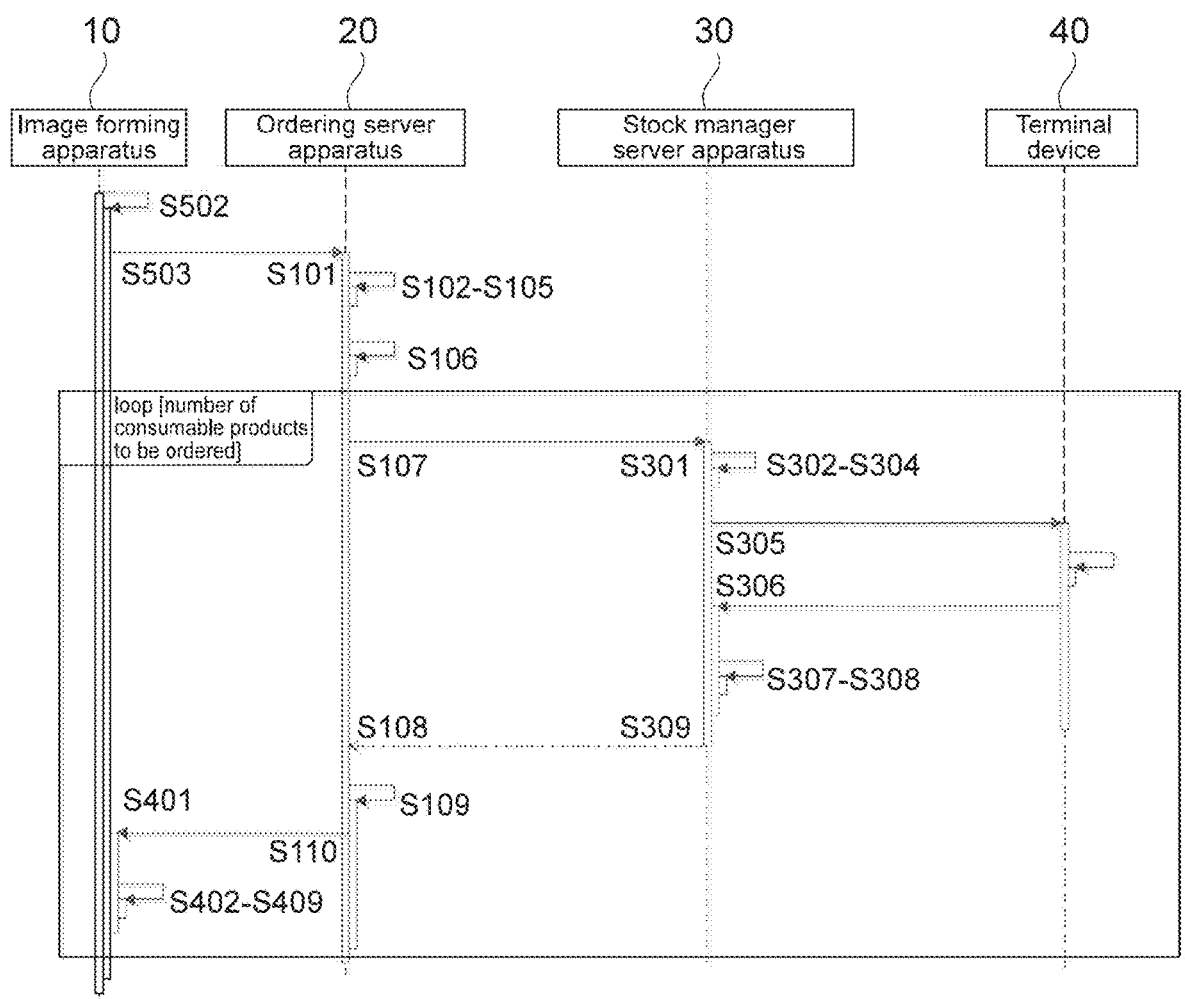
FIG. 12 shows a first operational sequence of the ordering system.

FIG. 12 shows a first operational sequence of the ordering system.

Figure 7:
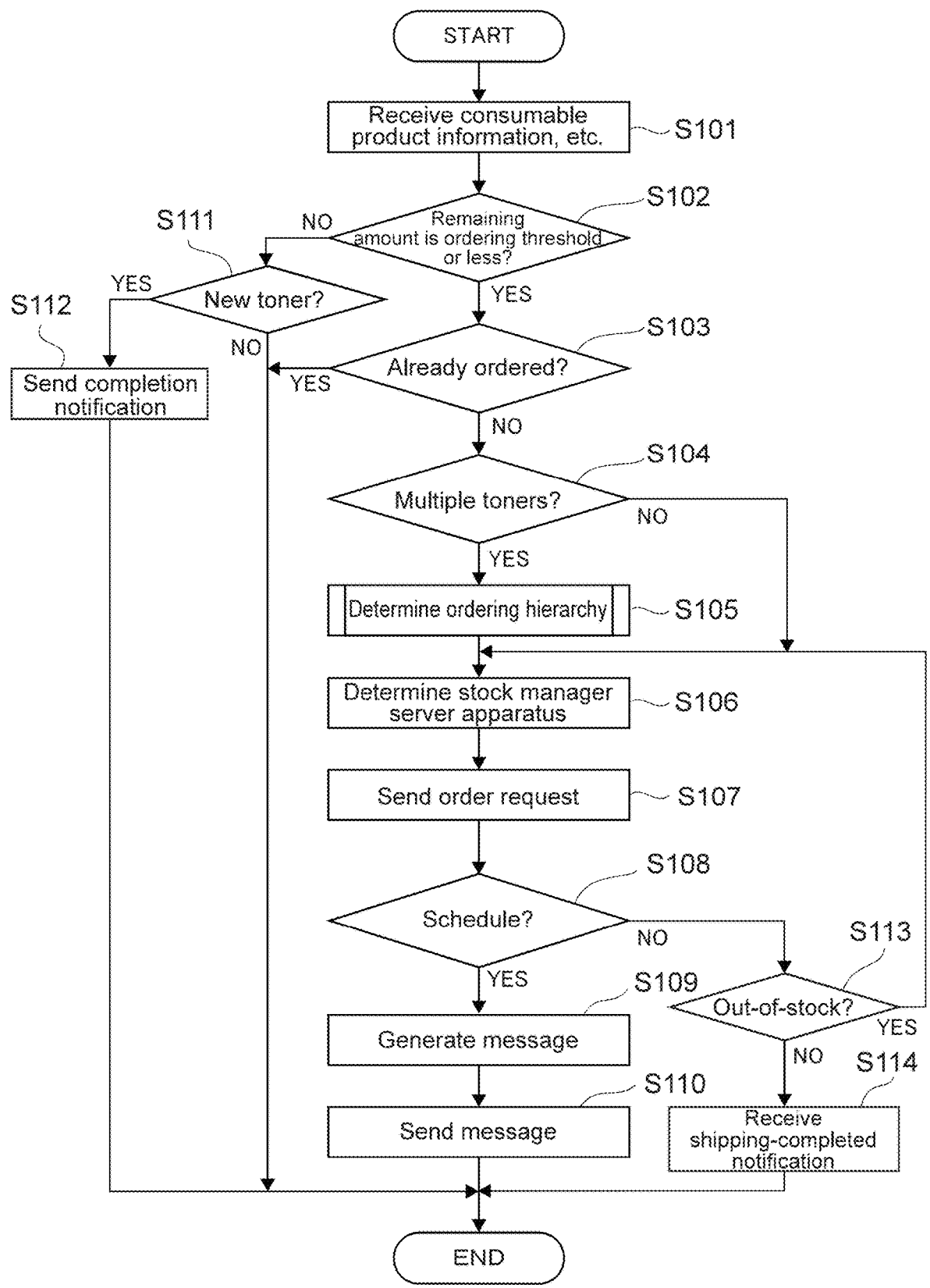
FIG. 7 shows a first operational flow of the ordering server apparatus.

FIG. 7 shows a first operational flow of the ordering server apparatus.

The consumable product information obtaining module 201 of the ordering server apparatus 20 receives an image forming apparatus identifier, image forming apparatus location information, and consumable product information, from the image forming apparatus 10 via the network N (Step S101). The ordering server apparatus 20 may periodically receive the information from the image forming apparatus 10, may periodically poll the image forming apparatus 10 and receive the information as a response, or may receive the information from the image forming apparatus 10 where the remaining amount reaches a certain value (ordering threshold).

The "image forming apparatus identifier" is, for example, a serial number, and uniquely identifies each image forming apparatus 10. The "image forming apparatus location information" is information indicating the location of the image forming apparatus 10, and is, for example, GPS information received by the GPS receiver device 11 of the image forming apparatus 10. The "consumable product information" is information about the consumable product (toner) in use in the image forming apparatus 10, and includes, for example, a toner name, a toner identifier, remaining amount information, and toner coverage information. The "toner name" identifies a toner type, and includes, for example, a model name and a color name. The "toner identifier" is, for example, a serial number, and uniquely identifies each toner. The remaining amount information indicates the remaining amount (toner level) of the toner in use in the image forming apparatus 10. The "toner coverage" is a percent of use of the toner on a sheet/sheets (for example, on one sheet). For example, where an entire sheet is painted with black color only, it means that the black color toner coverage is 100%.

The order determining module 202 of the ordering server apparatus 20 determines whether or not to order a consumable product to be used in the image forming apparatus 10 on a basis of the remaining amount information included in the consumable product information received from the image forming apparatus 10. For example, the order determining module 202 determines whether or not the remaining amount is the ordering threshold or less on a basis of the received consumable product information (Step S102). The "ordering threshold" may be, for example, about 10 to 30%, and is a value larger than "low" (about 5%).

If the order determining module 202 of the ordering server apparatus 20 determines that the remaining amount is the ordering threshold or less (Step S102, YES), the order determining module 202 determines whether or not a toner identified by the received toner name is already ordered for the image forming apparatus 10 identified by the received image forming apparatus identifier (Step S103). If the order determining module 202 determines that the toner is not ordered yet for the image forming apparatus 10 (Step S103, NO), the order determining module 202 determines whether or not there are multiple toners to order (Step S104).

If the order determining module 202 of the ordering server apparatus 20 determines that there are multiple toners to order (Step S104, YES), the order determining module 202 determines the ordering hierarchy of the multiple toners on a basis of priority (Step S105). The situation where "there are multiple toners to order" means a case where toners of multiple colors are to be ordered for one image forming apparatus 10, or a case where toners are to be ordered for the multiple image forming apparatuses 10 respectively. The order determining module 202 determines the ordering hierarchy of the multiple toners as follows. The order determining module 202 puts the highest priority on the remaining amount of a toner, puts the second priority on the toner coverage, and puts the third priority on the decrease rate of the toner. Specifically, the order determining module 202 determines the ordering hierarchy of the multiple toners as follows.

Figure 8:
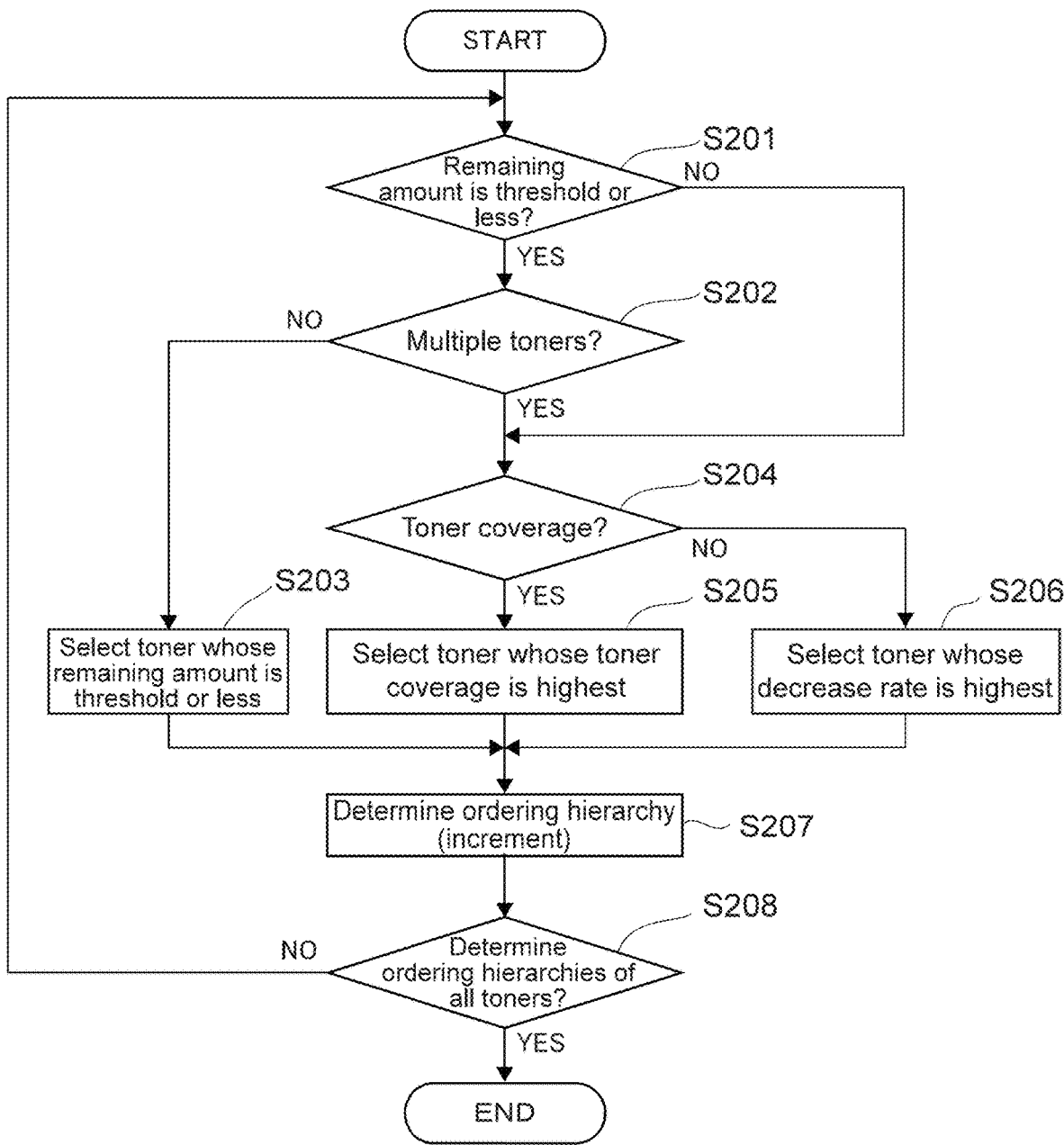
FIG. 8 shows the second operational flow of the ordering server apparatus.

FIG. 8 shows the second operational flow of the ordering server apparatus.

The order determining module 202 of the ordering server apparatus 20 determines whether or not there is a toner whose remaining amount is the threshold or less out of the multiple toners (Step S201). The "threshold" is, typically, a value smaller than the ordering threshold (about 10 to 30%), and is, for example, about 5% (low).

If there is a toner whose remaining amount is the threshold or less (Step S201, YES) and if the number of a toner whose remaining amount is the threshold or less is one (Step S202, NO), the order determining module 202 of the ordering server apparatus 20 selects this toner (Step S203). The order determining module 202 determines the ordering hierarchy of the selected toner (Step S207). The order determining module 202 determines the ordering hierarchy of each toner by incrementing by 1 where the default value is 1.

Meanwhile, if there is no toner whose remaining amount is the threshold or less (Step S201, NO) or if there are multiple toners whose remaining amounts are the threshold or less (Step S202, YES), the order determining module 202 of the ordering server apparatus 20 compares the toner coverage the multiple toners with each other (Step S204, YES). The order determining module 202 selects a toner whose toner coverage is the highest (Step S205). The order determining module 202 determines the ordering hierarchy of the selected toner (Step S207).

Meanwhile, if the toner coverages of the multiple toners are unknown (typically, toner coverage information is not received from the image forming apparatus 10) (Step S204, NO), the order determining module 202 of the ordering server apparatus 20 determines the decrease rates of a certain time period of the multiple toners on a basis of remaining amount information of the certain time period, and selects a toner whose decrease rate is the highest (Step S206). The order determining module 202 determines the ordering hierarchy of the selected toner (Step S207).

Figure 14:
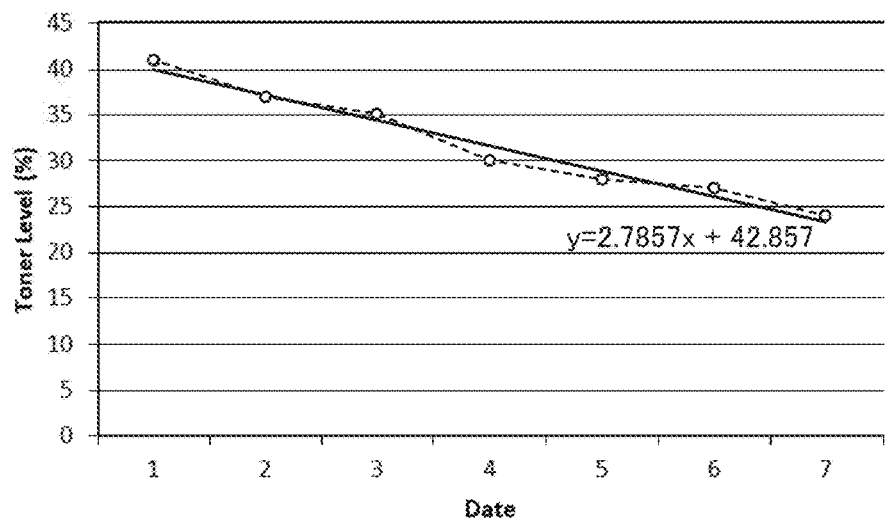
FIG. 14 shows a graph illustrating a decrease rate.

FIG. 14 shows a graph illustrating a decrease rate.

Specifically, the order determining module 202 of the ordering server apparatus 20 calculates a linear approximation formula of the least squares method for the remaining amount (dotted line of FIG. 14) in a certain time period (for example, one week) received from the image forming apparatus 10. The order determining module 202 calculates the inclination (−2.7857 in FIG. 14) of the approximation line (solid line of FIG. 14). It means that the steeper the inclination (negative value), the higher the decrease rate of the toner level.

With reference to FIG. 8, the order determining module 202 of the ordering server apparatus 20 determines the ordering hierarchies of all the multiple toners (Step S208). In short, the order determining module 202 determines the ordering hierarchies of all the multiple toners by putting the highest ordering priority on the toner whose remaining amount is the threshold or less. Alternatively, the order determining module 202 determines the ordering hierarchies of all the multiple toners in the descending order from the toner whose toner coverage is the highest. Alternatively, the order determining module 202 determines the ordering hierarchies of all the multiple toners in the descending order from the toner whose decrease rate is the highest.

With reference to FIG. 7, the order determining module 202 of the ordering server apparatus 20 determines the stock manager server apparatus 30 to order each toner to be ordered (Step S106). Specifically, the order determining module 202 determines, on a basis of the image forming apparatus location information (Step S101) received from the image forming apparatus 10 and location information of the stock manager server apparatus 30 (stock manager server location information), the one stock manager server apparatus 30 whose distance from the image forming apparatus 10 is the smallest as an ordering destination.

Note that the ordering server apparatus 20 may receive the stock manager server location information from the stock manager server apparatus 30 via the network N periodically or at arbitrary timing (for example, at the time of connection or reconnection to the network N). The "stock manager server location information" is, for example, GPS information received by the GPS receiver device 39 of the stock manager server apparatus 30.

The ordering module 203 of the ordering server apparatus 20 sends an order request to order a toner to the stock manager server apparatus 30, which is the ordering destination, via the network N (Step S107). The "order request" includes a toner name (including model name and color name) of the toner to be ordered, the image forming apparatus identifier of the image forming apparatus 10 to use the ordered toner, and the image forming apparatus location information.

Figure 9:
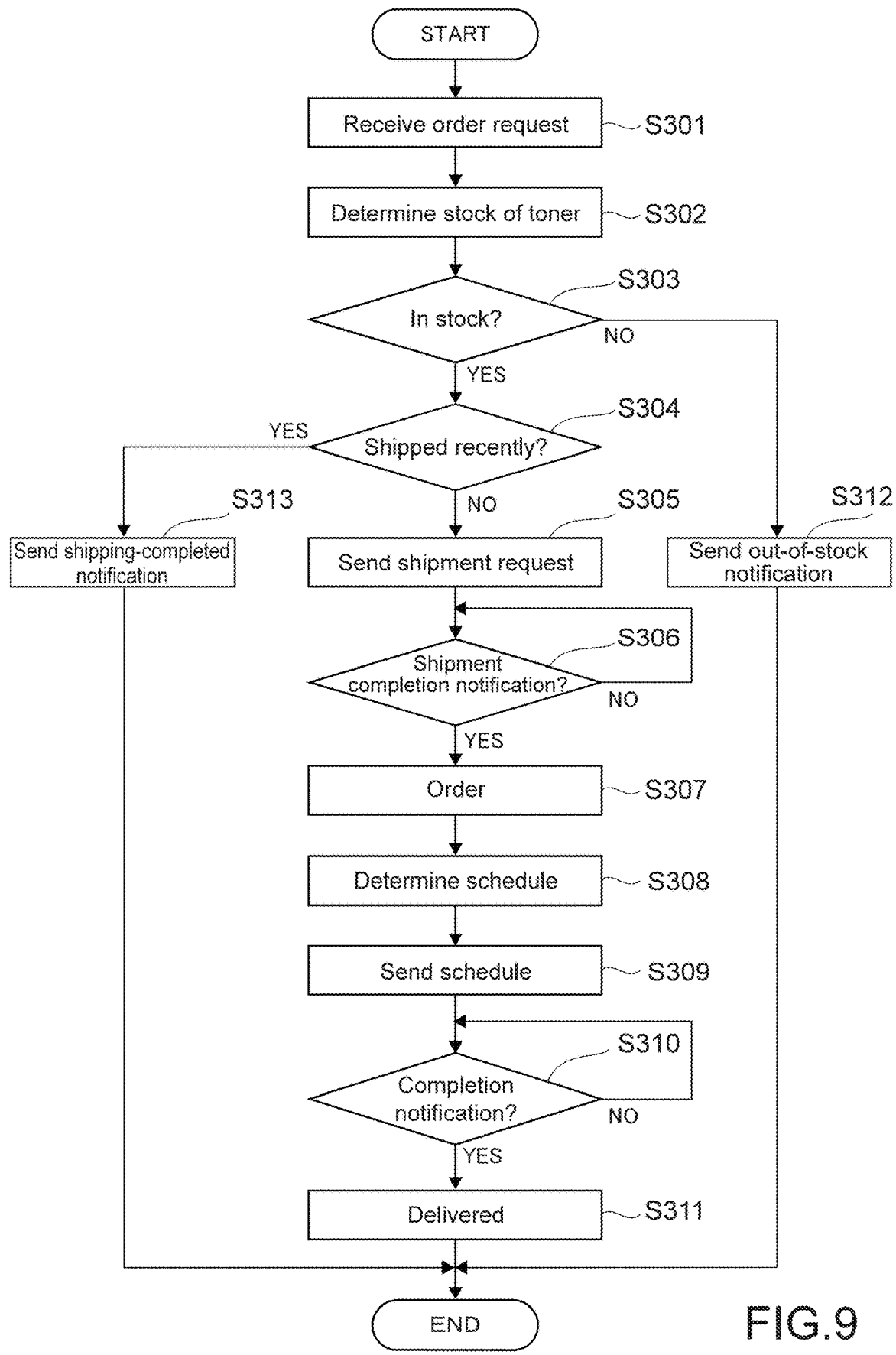
FIG. 9 shows an operational flow of the stock manager server apparatus.

FIG. 9 shows an operational flow of the stock manager server apparatus.

The order request obtaining module 301 of the stock manager server apparatus 30 receives the order request from the ordering server apparatus 20 via the network N (Step S301).

The stock manager module 302 of the stock manager server apparatus 30 determines, with reference to the stock manager table 310 stored in the storage device 34, whether or not there is a stock of the toner (in short, toner to be ordered) indicated by the toner name included in the order request received from the ordering server apparatus 20 (Step S302).

Figure 15:
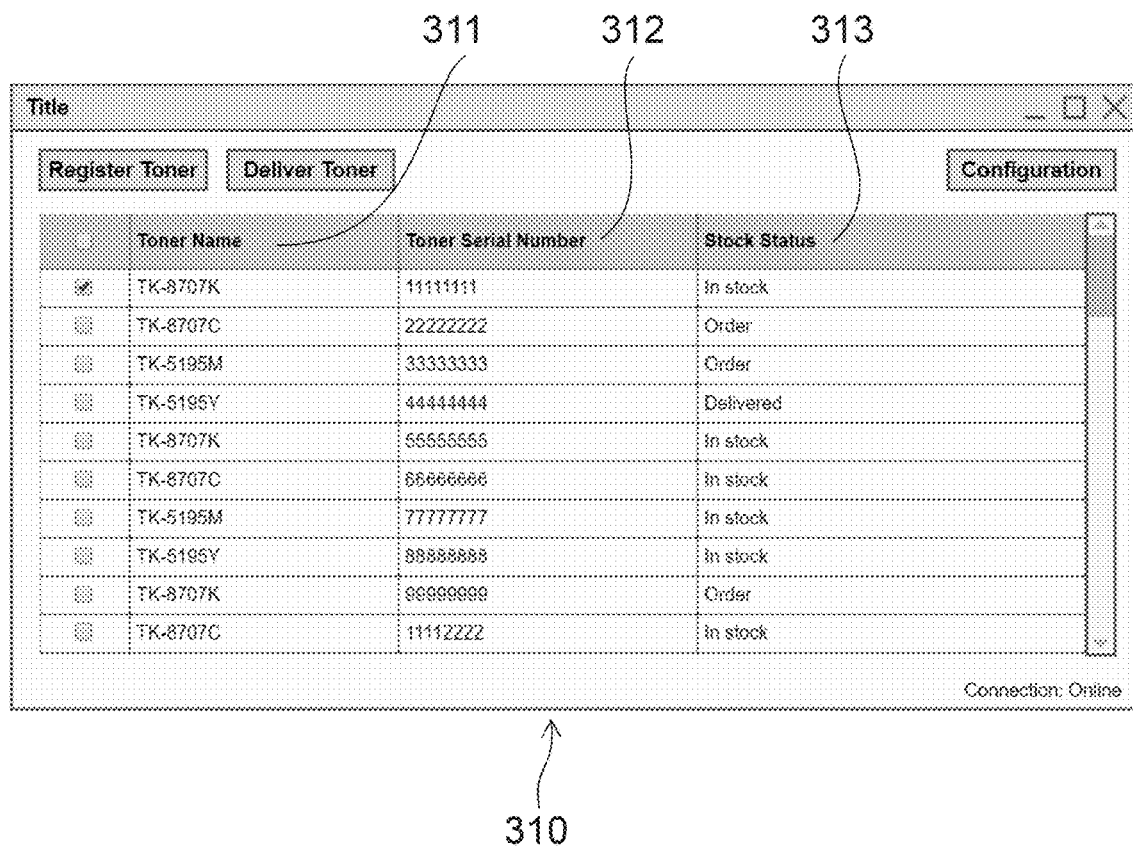
FIG. 15 shows an example of a structure of a stock manager table.

FIG. 15 shows an example of a structure of a stock manager table.

The stock manager table 310 stores the toner name 311, the toner identifier 312, and the stock status 313 in association with each other. The toner name 311 identifies a toner type, and includes, for example, a model name and a color name. The toner identifier 312 is, for example, a serial number, and uniquely identifies an individual toner. The stock status 313 is "In stock", "Order", or "Delivered". "In stock" means that there is a stock of a toner. "Order" means that the stock manager server apparatus 30 sent a toner order request to the terminal device 40, but a toner is not shipped yet. "Delivered" means that a toner is delivered to the site of the image forming apparatus 10.

With reference to FIG. 9, the stock manager module 302 of the stock manager server apparatus 30 determines, with reference to the stock manager table 310, whether or not the stock status 313 being "In stock" is in association with the toner name 311 included in the order request received from the ordering server apparatus 20 (i.e., there is a stock of a toner to be ordered) (Step S302). The stock manager module 302 of the stock manager server apparatus 30 determines that "In stock" is in association with the toner name 311 (i.e., there is a stock of a toner to be ordered) (Step S303, YES).

Next, the stock manager module 302 of the stock manager server apparatus 30 determines, with reference to the order table 320 stored in the storage device 34, whether or not the toner, which is identified by the toner name included in the order request received from the ordering server apparatus 20, was shipped to the image forming apparatus 10, which is identified by the image forming apparatus identifier included in the order request, in a recent certain time period (for example, about several days to several weeks) (Step S304). This is to avoid a situation in which the same toners are double-shipped to the single image forming apparatus 10.

Figures 16, 17:
FIG. 16 shows an example of a structure of an order table.
FIG. 17 shows an example of a message window.

FIG. 16 shows an example of a structure of an order table.

The order table 320 stores the toner name 321, the toner identifier 322, the image forming apparatus identifier 323, and the image forming apparatus location information 324 in association with each other. In the order table 320, information about a toner, of which shipment request was sent to the terminal device 40 from the stock manager server apparatus 30 in the recent certain time period, is registered.

With reference to FIG. 9, the stock manager module 302 of the stock manager server apparatus 30 determines whether or not the toner name 321 and the image forming apparatus identifier 323 included in the order request received from the ordering server apparatus 20 are registered in the order table 320 in association with each other (Step S304).

The stock manager module 302 of the stock manager server apparatus 30 determines that the toner name 321 and the image forming apparatus identifier 323 are not registered in association with each other (Step S304, NO). It means that a toner identified by the toner name 321 was not shipped to the image forming apparatus 10 identified by the image forming apparatus identifier 323 in a recent certain time period (no possibility of double-shipping). The stock manager module 302 registers the toner name 321, the image forming apparatus identifier 323, and the image forming apparatus location information 324 included in the order request received from the ordering server apparatus 20, and the toner identifier 322 of the toner to be shipped in the order table 320 in association with each other.

The shipment requesting module 303 of the stock manager server apparatus 30 sends a toner shipment request (for example, email) to the terminal device 40 via the network N (Step S305). The "shipment request" is different from the "order request", and is a request to physically ship and distribute a toner.

A worker at a site (warehouse, etc.), from which a toner is shipped, uses the terminal device 40. The terminal device 40 receives the shipment request (for example, email) from the stock manager server apparatus 30 via the network N. The worker physically ships the toner according to the received shipment request. The terminal device 40 detects a certain operation (for example, operation for connecting to a link destination included in the email) input in the operation device 46 by a worker, and then sends a shipment completion notification to the stock manager server apparatus 30 via the network N.

The shipment requesting module 303 of the stock manager server apparatus 30 receives the shipment completion notification from the terminal device 40 via the network N (Step S306, YES). The shipment requesting module 303 receives the shipment completion notification (i.e., shipment of a consumable product is completed), and then updates the stock status 313 of the shipped toner from "In stock" to "Order" in the stock manager table 310 (Step S307).

The schedule determining module 304 of the stock manager server apparatus 30 determines, on a basis of the image forming apparatus location information and the stock manager server location information, an expected delivery schedule of the shipped toner (Step S308). In short, the schedule determining module 304 may determine the expected delivery schedule on a basis of the distance between the image forming apparatus 10 and the stock manager server apparatus 30. The schedule determining module 304 sends the expected delivery schedule information to the ordering server apparatus 20 via the network N (Step S309). The "expected delivery schedule information" includes the expected delivery schedule (date and time, etc.) and the toner name.

With reference to FIG. 7, the schedule obtaining module 204 of the ordering server apparatus 20 receives the expected delivery schedule information from the stock manager server apparatus 30 via the network N (Step S108, YES). The window generating module 205 of the ordering server apparatus 20 generates, on a basis of the received expected delivery schedule information, the message window data MSG that is used to display a message window showing the expected delivery schedule on the display device 17a of the image forming apparatus 10 (Step S109). The window generating module 205 sends the generated message window data MSG to the image forming apparatus 10 via the network N (Step S110).

Figure 10:
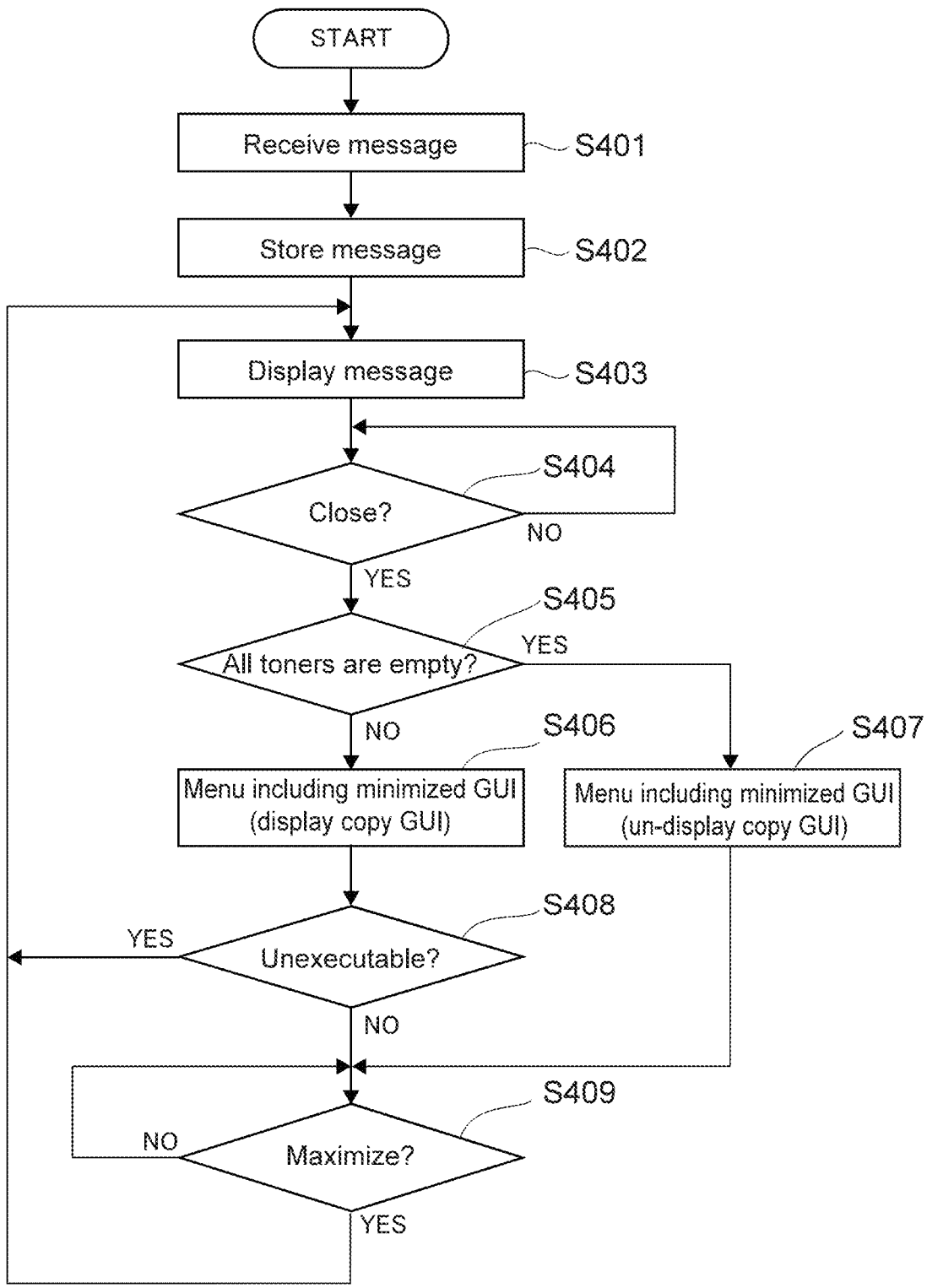
FIG. 10 shows a first operational flow of an image forming apparatus.

FIG. 10 shows a first operational flow of an image forming apparatus.

The window data obtaining module 101 of the image forming apparatus 10 receives the message window data MSG from the ordering server apparatus 20 via the network N (Step S401). The window data obtaining module 101 stores the received message window data MSG in the nonvolatile storage device 18 (Step S402). The window display controller module 102 of the image forming apparatus 10 reads the message window data MSG from the storage device 18, generates the message window 110, and displays the message window 110 on the display device 17a (Step S403).

FIG. 17 shows an example of a message window.

The message window 110 includes the toner name 111, the expected delivery schedule (date and time, etc.) 112, and the close button 113. The close button 113 is a GUI (Graphical User Interface) for inputting a request to minimize the message window 110 via the operation device 17.

With reference to FIG. 10, the window display controller module 102 of the image forming apparatus 10 detects that the close button 113 included in the message window 110 is operated via the operation device 17 (Step S404, YES). In other words, the window display controller module 102 detects a request to minimize the message window. Then, the window display controller module 102 reads a menu window including a minimized GUI from the storage device 18, and displays the menu window on the display device 17a.

Figure 18:
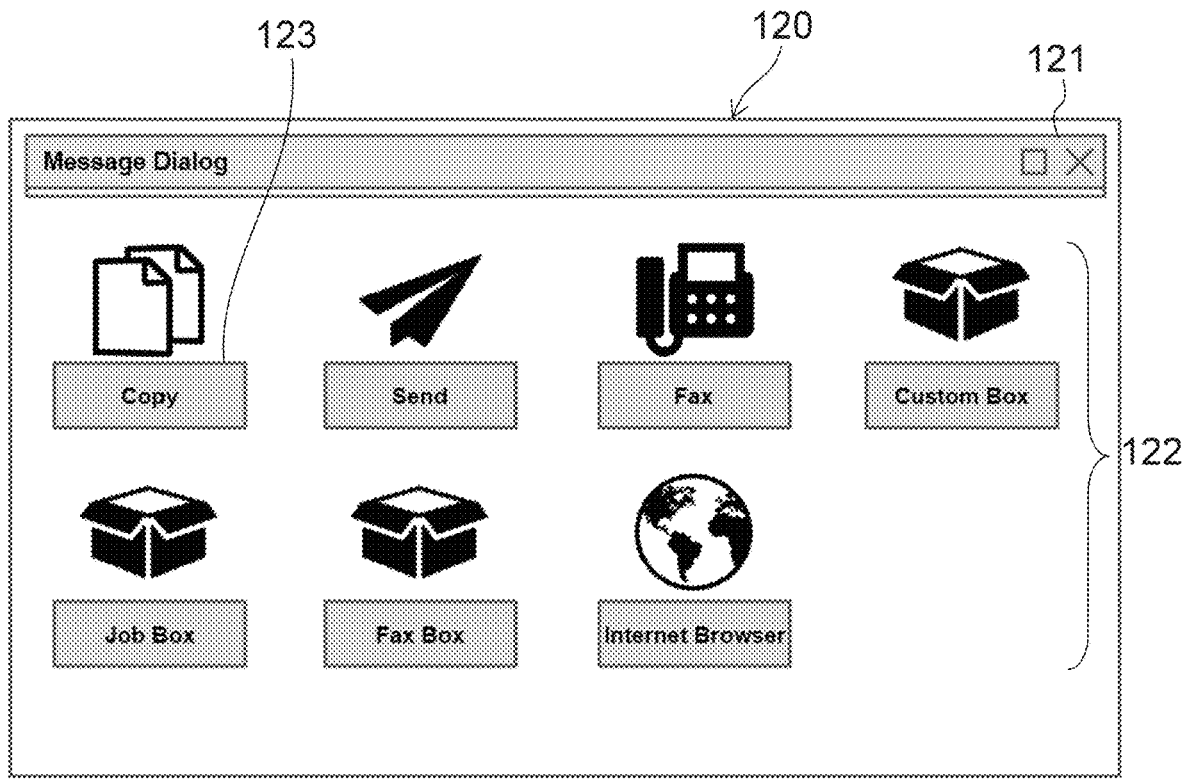
FIG. 18 shows an example of a menu window including a minimized GUI.

FIG. 18 shows an example of a menu window including a minimized GUI.

The menu window 120 includes the minimized GUI 121 and the multiple GUIs 122 (the copy function GUI 123 is displayed) indicating multiple functions currently executable by the image forming apparatus 10. The minimized GUI 121 is a GUI indicating that the message window 110 is minimized.

Figure 19:
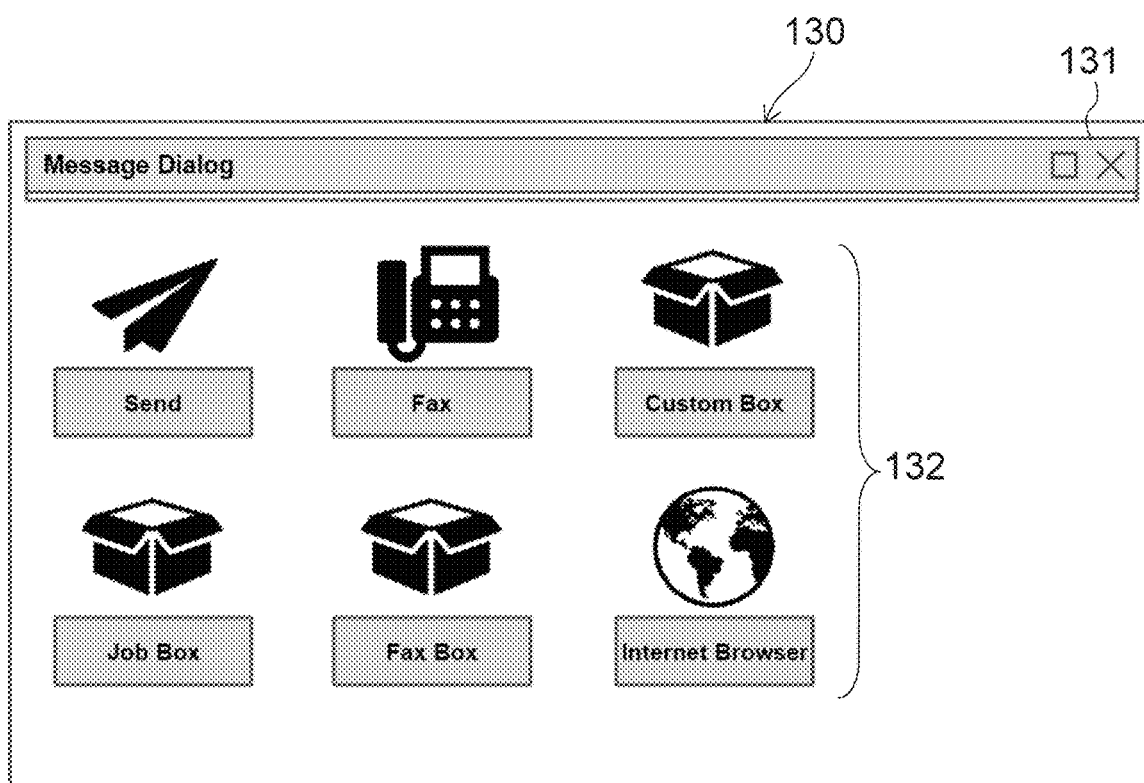
FIG. 19 shows another example of a menu window including the minimized GUI.

FIG. 19 shows another example of a menu window including the minimized GUI.

The menu window 130 includes the minimized GUI 131 and the multiple GUIs 132 (copy function GUI is undisplayed) indicating multiple functions currently executable by the image forming apparatus 10. The minimized GUI 131 is a GUI indicating that the message window 110 is minimized.

With reference to FIG. 10, the window display controller module 102 of the image forming apparatus 10 determines whether or not the all-color toners of the image forming apparatus 10 are empty (Step S405). If there is at least one-color toner that is not empty (Step S405, NO), the image forming apparatus 10 may execute a part of the copy function (for example, black-and-white copier is executable, but full-color copier is unexecutable). Therefore the window display controller module 102 displays the menu window 120 (displays the copy function GUI 123) (Step S406, FIG. 18). If the all-color toners of the image forming apparatus 10 are empty (Step S405, YES), the image forming apparatus 10 cannot execute the entire copy function (for example, both black-and-white copier and full-color copier are unexecutable). Therefore the window display controller module 102 displays the menu window 130 (un-display copy function GUI) (Step S407, FIG. 19).

Hereinafter, description will be made assuming that there is a toner that is not empty (Step S405, NO) and the menu window 120 (the copy function GUI 123 is displayed) is displayed (Step S406, FIG. 18).

A user operates the copy function GUI 123 included in the menu window 120 displayed on the operation device 17 including the display device 17a (touch panel). The window display controller module 102 detects the operation, and then reads the copy menu window 140 including the minimized GUI 141 from the storage device 18 and displays the copy menu window 140 on the display device 17a.

Figure 20:
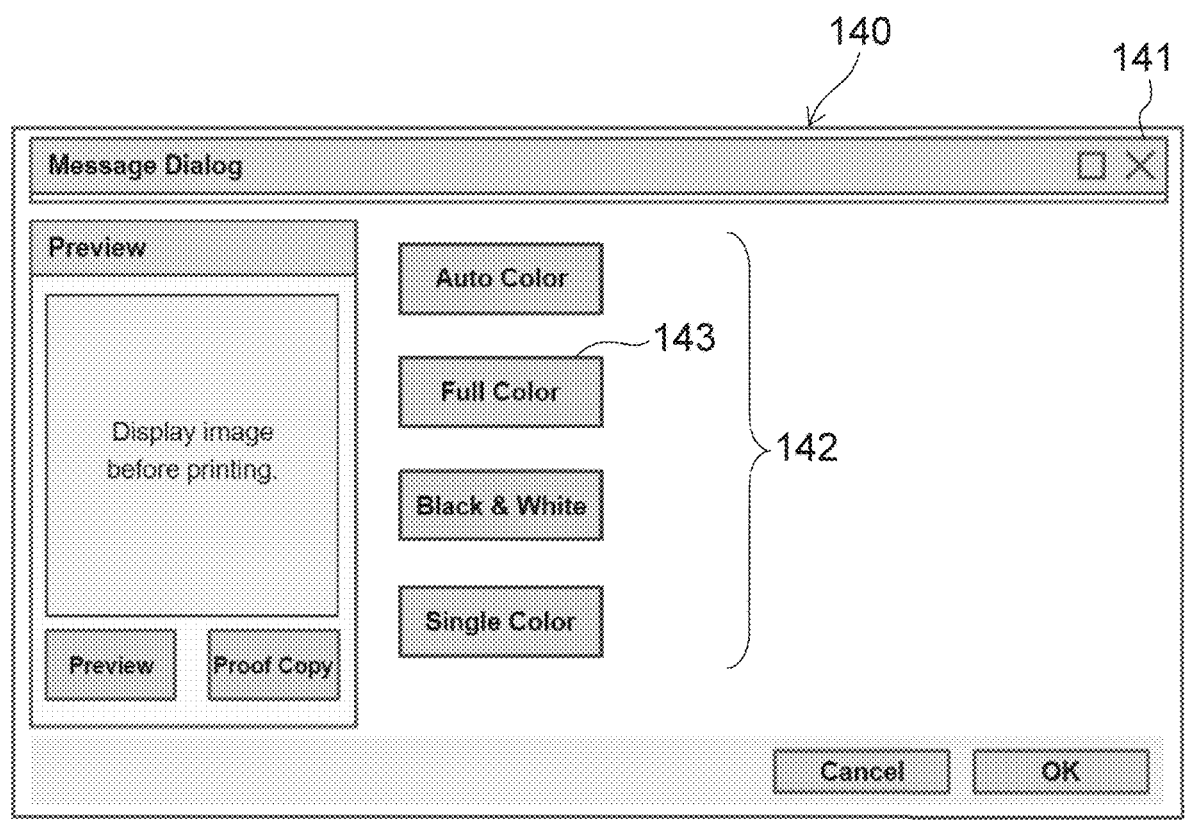
FIG. 20 shows an example of the copy menu window including the minimized GUI.

FIG. 20 shows an example of the copy menu window including the minimized GUI.

The copy menu window 140 includes the minimized GUI 141, the multiple color-selection function GUIs 142, and the like. The minimized GUI 141 is a GUI indicating that the message window 110 is minimized. The multiple color-selection function GUIs 142 are GUIs for selecting color modes of the copy function.

With reference to FIG. 10, the window display controller module 102 of the image forming apparatus 10 detects a request to select a color-selection function GUI 142, which is unexecutable, input via the operation device 17 (Step S408, YES). According to an exemplary case, the full-color GUI 143 is selected where the black-and-white copier is executable but the full-color copier is unexecutable. In this case, the window display controller module 102 reads the message window data MSG from the storage device 18, generates the message window 110, and displays the message window 110 on the display device 17a (Step S403).

Further, the window display controller module 102 of the image forming apparatus 10 detects a request (i.e., operation of the minimized GUI 121, 131, or 141) to maximize the minimized GUI 121, 131, or 141 displayed on the window 120, 130, or 140 (Step S409, YES). Then the window display controller module 102 reads the message window data MSG from the storage device 18, generates the message window 110, and displays the message window 110 on the display device 17a (Step S403).

Figure 13:
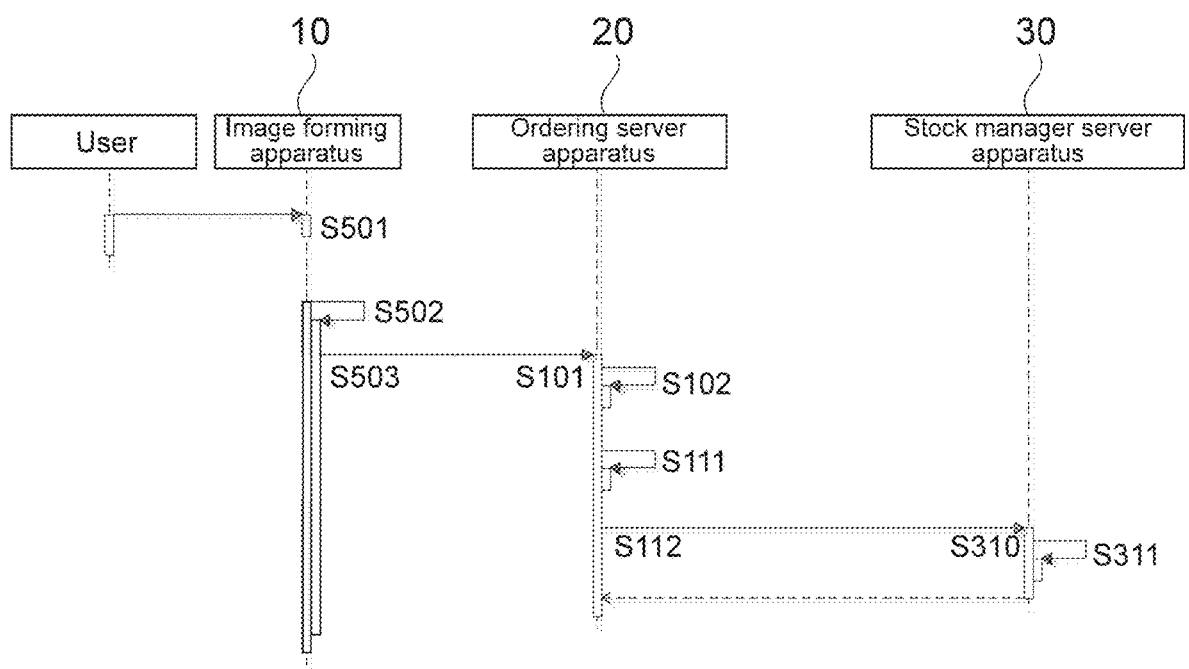
FIG. 13 shows a second operational sequence of the ordering system.

FIG. 13 shows a second operational sequence of the ordering system.

Figure 11:
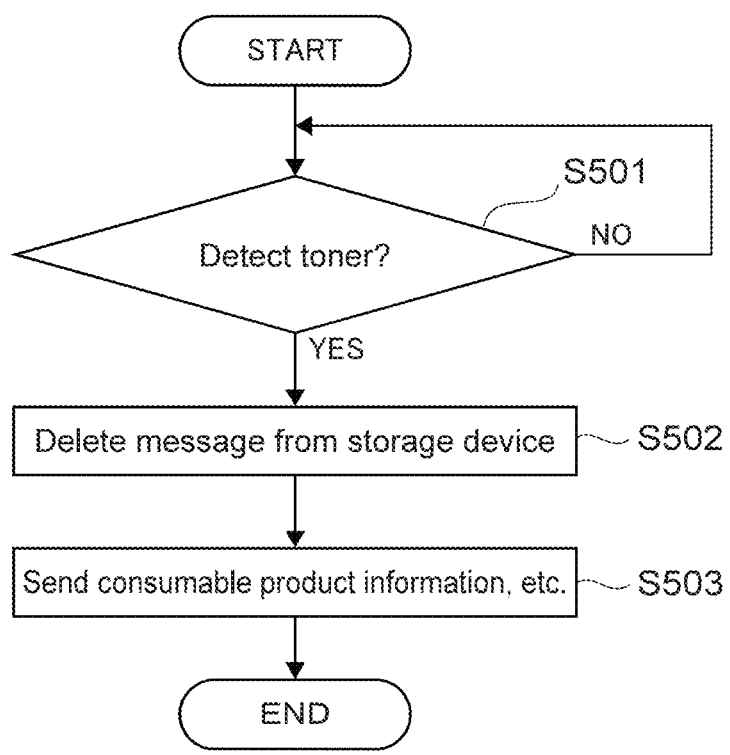
FIG. 11 shows a second operational flow of the image forming apparatus.

FIG. 11 shows a second operational flow of the image forming apparatus.

The shipped toner is delivered to the site of the image forming apparatus 10, and a user of the image forming apparatus 10 physically attaches the toner to the image forming apparatus 10. The toner-attached determining module 103 of the image forming apparatus 10 detects that a toner identified by a new toner identifier is physically attached (Step S501, YES). Then, the toner-attached determining module 103 deletes, from the storage device 18, the message window data MSG (Step S402) stored in the storage device 18 (Step S502). As a result, the window display controller module 102 of the image forming apparatus 10 is incapable of reading the message window data MSG from the storage device 18, generating the message window 110, and displaying the message window 110 on the display device 17a. Further, the window display controller module 102 then reads a menu window and the like (not shown) including no minimized GUI from the storage device 18, and displays the menu window and the like on the display device 17a.

The toner-attached determining module 103 of the image forming apparatus 10 sends the image forming apparatus identifier, the image forming apparatus location information, and the consumable product information to the ordering server apparatus 20 via the network N periodically or at arbitrary timing (Step S503). As described above, the "consumable product information" includes, for example, the toner name, the toner identifier, the remaining amount information, and the toner coverage information. Therefore the consumable product information of the image forming apparatus 10, to which the new toner is attached, includes the new toner identifier and the remaining amount information (nearly 100%).

With reference to FIG. 7, the consumable product information obtaining module 201 of the ordering server apparatus 20 receives the image forming apparatus identifier, the image forming apparatus location information, and the consumable product information from the image forming apparatus 10 via the network N (Step S101). The order determining module 202 determines that the remaining amount is larger than the ordering threshold (Step S102, NO). The order determining module 202 determines whether or not the received consumable product information includes the new toner identifier and the remaining amount information (nearly 100%) (Step S111). In this example, the order determining module 202 determines that the consumable product information includes the new toner identifier and the remaining amount information (nearly 100%) (Step S111, YES). As a result, the order determining module 202 determines that the ordered toner is attached to the image forming apparatus 10.

The ordering module 203 of the ordering server apparatus 20 sends a completion notification, which indicates that the toner is attached to the image forming apparatus 10, to the stock manager server apparatus 30, which sent the order request (Step S107), via the network N (Step S112). The "completion notification" includes the toner identifier and the image forming apparatus identifier received from the image forming apparatus 10.

With reference to FIG. 9, the completion notification obtaining module 305 of the stock manager server apparatus 30 receives the completion notification from the ordering server apparatus 20 via the network N (Step S310, YES). The completion notification obtaining module 305 updates the stock status 313 in association with the toner identifier 312 included in the completion notification from "Order" to "Delivered" in the stock manager table 310 (Step S311).

The mainstream of the operational flow has been described above. Hereinafter, sub-streams (1) and (2) of the operational flow will be described.

(1) A case where a toner to be ordered is out of stock in the stock manager server apparatus With reference to FIG. 9, the stock manager module 302 of the stock manager server apparatus 30 determines, with reference to the stock manager table 310, that there is no toner name 311 (i.e., a toner to be ordered is out of stock) in association with the stock status 313 being "In stock" (Step S303, NO). In this case, the stock manager module 302 sends an out-of-stock notification, which indicates that a toner to be ordered is out of stock, to the ordering server apparatus 20 via the network N (Step S312).

With reference to FIG. 7, the order determining module 202 of the ordering server apparatus 20 receives the out-of-stock notification from the stock manager server apparatus 30 via the network N (Step S113, YES). Then, the order determining module 202 determines another stock manager server apparatus 30 as the ordering destination (Step S106).

(2) A case where a toner was shipped in a recent certain time period from the stock manager server apparatus With reference to FIG. 9, the stock manager module 302 of the stock manager server apparatus 30 determines that a toner identified by the toner name 321 was shipped (supposed to be double-shipping) to the image forming apparatus 10, which is identified by the image forming apparatus identifier 323, in a recent certain time period (Step S304, YES). In this case, the stock manager module 302 sends a shipping-completed notification, which indicates that shipping is completed, to the ordering server apparatus 20 via the network N (Step S313).

With reference to FIG. 7, the order determining module 202 of the ordering server apparatus 20 receives the shipping-completed notification from the stock manager server apparatus 30 via the network N (Step S114). Then, the order determining module 202 finishes the processing.

8. Conclusion (1) An image forming apparatus consumes a toner being a consumable product. When the remaining amount of the consumable product is low, a user of the image forming apparatus needs to order a new consumable product. However, the user of the image forming apparatus needs to know information of an ordering destination (distributor (seller)) in advance. Further, the ordering destination that the user knows may not always be the best ordering destination (distance is far, etc.). Further, the ordering destination that the user knows may not always keep a stock of the toner.

(1-1) To the contrary, according to the present embodiment, the ordering server apparatus 20 orders a consumable product for the one stock manager server apparatus 30 having a smallest distance from the image forming apparatus 10 (Step S107). As a result, it may take the shortest time to deliver the consumable product. Further, even if a user of the image forming apparatus 10 does not know the stock manager server apparatus 30 having the smallest distance, the ordering server apparatus 20 is capable of selecting the stock manager server apparatus 30 having the smallest distance.

(1-2) According to the present embodiment, the stock manager server apparatus 30 obtains the image forming apparatus location information and stock manager server location information. Therefore the stock manager server apparatus 30 is capable of determining the expected delivery schedule on a basis of the distance from the image forming apparatus 10 to the stock manager server apparatus 30 (Step S109), and sending the expected delivery schedule to the image forming apparatus 10 (Step S110). The image forming apparatus 10 is capable of displaying the expected delivery schedule (Step S403).

(1-3) According to the present embodiment, the ordering server apparatus 20 receives out-of-stock notification from the stock manager server apparatus 30 (Step S113, YES), and then orders the consumable product for the one stock manager server apparatus 30 whose distance from the image forming apparatus 10 is the second smallest (Step S106). Therefore it is possible to avoid a case in which ordering is made to the stock manager server apparatus 30 out of stock, the consumable product is on back order as a result, and shipment of the consumable product is delayed greatly. Further, according to the present embodiment, it is possible to order the consumable product for the stock manager server apparatus 30 having a stock of the consumable product and having the smallest distance. Therefore it may take a relatively short time to deliver the consumable product. Further, even if a user of the image forming apparatus 10 does not know the stock manager server apparatus 30 having the second smallest distance, the ordering server apparatus 20 is capable of selecting the stock manager server apparatus 30 having the second smallest distance.

(1-4) According to the present embodiment, the ordering server apparatus 20 determines that the ordered consumable product is attached to the image forming apparatus 10 (Step S111, YES), and then sends, to the stock manager server apparatus 30, a completion notification (Step S112). As a result, the stock manager server apparatus 30 is capable of managing the stock more accurately.

(1-5) According to the present embodiment, the ordering server apparatus 20 puts a highest ordering priority on a toner whose remaining amount is a threshold or less (Step S203). Further, the ordering server apparatus 20 sends, in a descending order from a toner whose toner coverage is highest, order requests to the stock manager server apparatus 30 (Step S205). Since the high toner coverage means the large use amount of a toner, it is necessary to order such a toner at a higher priority. As a result, the ordering server apparatus 20 is capable of ordering the toners in the descending order from the toner which should be ordered the most. Further, since toners are ordered one by one, it is possible to avoid a situation in which multiple toners are ordered in a batch to the one stock manager server apparatus 30, some toners are out of stock, and shipment of all the toners is thereby delayed.

(1-6) According to the present embodiment, the ordering server apparatus 20 sends, in a descending order from a toner whose decrease rate is highest, order requests to the stock manager server apparatus 30 (Step S206). Since the high decrease rate means the large use amount of a toner, it is necessary to order such a toner at a higher priority. As a result, the ordering server apparatus 20 is capable of ordering the toners in the descending order from the toner which should be ordered the most. Further, since toners are ordered one by one, it is possible to avoid a situation in which multiple toners are ordered in a batch to the one stock manager server apparatus 30, some toners are out of stock, and shipment of all the toners is thereby delayed.

(2) A display device of an image forming apparatus is smaller than a display device of a personal computer or the like. So, where a message window showing an expected delivery schedule and the like of a consumable product is displayed on a display device of an image forming apparatus, an area in which other information is displayed may be small, or it may be difficult to input other operations. Meanwhile, if a message window is un-displayed as a result of an operation of one user, then another user may lose a chance to know information included in the message window.

(2-1) To the contrary, according to the present embodiment, the image forming apparatus 10 detects a request to minimize the message window (Step S404, YES), and then displays a minimized GUI on the display device 17a (Step S406, Step S407). As described above, by displaying the minimized GUI, the image forming apparatus 10 is capable of explicitly indicating that there is a message window to a user. Further, the image forming apparatus 10 detects a request to maximize the minimized GUI (Step S409, YES), and then reads the message window data from the nonvolatile storage device 18 and displays the message window on the display device 17*a* (Step S403). As described above, since the message window data is stored in the nonvolatile storage device 18, the image forming apparatus 10 is capable of displaying the message window when a user wants to maximize the message window.

(2-2) According to the present embodiment, if there is no need to display the message window (Step S501, YES), then the image forming apparatus 10 un-displays the message window and the minimized GUI on the display device 17*a* (Step S502). So it may not be hard to handle the display device 17*a* and the operation device 17 by displaying the unnecessary window. Further, the fact that the message window and the minimized GUI are un-displayed on the display device 17*a* may teach a user that a consumable product is attached.

(2-3) According to the present embodiment, the image forming apparatus 10 detects a request to select the function GUI showing the function that the image forming apparatus is incapable of executing (Step S408, YES), and then reads the message window data from the nonvolatile storage device 18 and displays the message window on the display device 17*a* (Step S403). As a result, the image forming apparatus 10 is capable of displaying the message window where it is highly necessary to let the user to know the message.

(2-4) According to the present embodiment, when the image forming apparatus is incapable of executing all the function using the consumable product, the image forming apparatus 10 displays the minimized GUI and un-display a GUI showing the function (Step S407). As described above, by displaying the minimized GUI, the image forming apparatus 10 is capable of explicitly indicating that there is a message window to a user. In addition, the image forming apparatus 10 is capable of letting the user know that all the functions are unexecutable.

It should be understood by those skilled in the art that various modifications, combinations, sub-combinations and alterations may occur depending on design requirements and other factors insofar as they are within the scope of the appended claims or the equivalents thereof.

What is claimed is:

1. An ordering system, comprising:
an image forming apparatus using a consumable product;
one or more stock manager server apparatuses physically distant from the image forming apparatus; and
an ordering server apparatus physically distant from the image forming apparatus and the one or more stock manager server apparatuses, and communicatively connected to the image forming apparatus and the one or more stock manager server apparatuses via a network,
the ordering server apparatus being configured to send communication to one of the one or more stock manager server apparatuses depending on a remaining amount of the consumable product in use in the image forming apparatus,
each of the one or more stock manager server apparatuses being used by a distributor that distributes the consumable product, and being configured to receive the communication from the ordering server apparatus and manage stock of the consumable product,
each location of the one or more stock manager server apparatuses being different from each other and unknown by the image forming apparatus,
each distance to each of the one or more stock manager server apparatuses from the image forming apparatus being different from each other and unknown by the image forming apparatus,
the image forming apparatus being configured to
send remaining amount information to the ordering server apparatus, the remaining amount information indicating a remaining amount of a consumable product in use in the image forming apparatus,
the ordering server apparatus being configured to
receive the remaining amount information from the image forming apparatus,
determine to order a consumable product to be used in the image forming apparatus on a basis of the remaining amount information,
obtain image forming apparatus location information, the image forming apparatus location information indicating location information of the image forming apparatus,
obtain stock manager server location information, the stock manager server location information indicating location information of each of the one or more stock manager server apparatuses,
determine, on a basis of the image forming apparatus location information and the stock manager server location information, one stock manager server apparatus having a smallest distance from the image forming apparatus, and
send, to the determined stock manager server apparatus, an order request to order the consumable product.

2. The ordering system according to claim 1, wherein
the order request includes the image forming apparatus location information,
the stock manager server apparatus is configured to
receive the order request from the ordering server apparatus,
after shipment of the consumable product is completed, determine, on a basis of the image forming apparatus location information and the stock manager server location information, an expected delivery schedule of the shipped consumable product, and
send expected delivery schedule information to the ordering server apparatus, the expected delivery schedule information indicating the expected delivery schedule, and
the ordering server apparatus is configured to
receive the expected delivery schedule information from the stock manager server apparatus, and
send the expected delivery schedule information to the image forming apparatus.

3. The ordering system according to claim 1, wherein
the stock manager server apparatus is configured to
receive the order request from the ordering server apparatus, and
if it is determined that the consumable product is out of stock, send an out-of-stock notification to the ordering server apparatus, the out-of-stock notification being a notification indicating that the consumable product is out of stock, and
the ordering server apparatus is configured to
receive the out-of-stock notification from the stock manager server apparatus, then
determine, on a basis of the image forming apparatus location information and the stock manager server location information, one stock manager server apparatus whose distance from the image forming apparatus is second smallest, and
send, to the determined stock manager server apparatus, an order request to order the consumable product.

4. The ordering system according to claim 1, wherein
the ordering server apparatus is configured to
- determine, on a basis of the remaining amount information received from the image forming apparatus, that the ordered consumable product is attached to the image forming apparatus, and
- send, to the stock manager server apparatus, a completion notification indicating that the consumable product is attached to the image forming apparatus.

5. The ordering system according to claim 1, wherein
the consumable product includes multiple toners,
the image forming apparatus is configured to
- send, for each of the multiple toners, the remaining amount information and toner coverage information to the ordering server apparatus, the toner coverage information indicating a toner coverage, the toner coverage being a percent of use of the toner on a sheet, and the ordering server apparatus is configured to
- receive, for each of the multiple toners, the remaining amount information and the toner coverage information from the image forming apparatus,
- determine to order the multiple toners on a basis of the remaining amount information,
- put a highest ordering priority on a toner whose remaining amount indicated by the remaining amount information is a threshold or less, and send, to the stock manager server apparatus, an order request to order the toner, and
- if there are multiple toners each of whose remaining amount indicated by the remaining amount information is the threshold or less, in a descending order from a toner whose toner coverage indicated by the toner coverage information is highest, send, to the stock manager server apparatus, multiple order requests to order the multiple toners respectively.

6. The ordering system according to claim 1, wherein
the consumable product includes multiple toners,
the image forming apparatus is configured to
- send, for each of the multiple toners, the remaining amount information to the ordering server apparatus, and the ordering server apparatus is configured to
- receive, for each of the multiple toners, the remaining amount information from the image forming apparatus,
- determine to order the multiple toners on a basis of the remaining amount information,
- determine decrease rates of a certain time period of the multiple toners on a basis of remaining amount information of the certain time period, and
- in a descending order from a toner whose decrease rate is highest, send, to the stock manager server apparatus, multiple order requests to order the multiple toners respectively.

7. An ordering server apparatus physically distant from an image forming apparatus using a consumable product and the one or more stock manager server apparatuses physically distant from the image forming apparatus, and communicatively connected to the image forming apparatus and the one or more stock manager server apparatuses via a network,
the ordering server apparatus being configured to send communication to one of the one or more stock manager server apparatuses depending on a remaining amount of the consumable product in use in the image forming apparatus, each of the one or more stock manager server apparatuses being used by a distributor that distributes the consumable product, and being configured to receive the communication from the ordering server apparatus and manage stock of the consumable product,
each location of the one or more stock manager server apparatuses being different from each other and unknown by the image forming apparatus,
each distance to each of the one or more stock manager server apparatuses from the image forming apparatus being different from each other and unknown by the image forming apparatus,
the ordering server apparatus comprising:
a controller circuit configured to
- receive remaining amount information from the image forming apparatus, the remaining amount information indicating a remaining amount of the consumable product in use in the image forming apparatus,
- determine to order a consumable product to be used in the image forming apparatus on a basis of the remaining amount information,
- obtain image forming apparatus location information, the image forming apparatus location information indicating location information of the image forming apparatus,
- obtain stock manager server location information, the stock manager server location information indicating location information of each of the one or more stock manager server apparatuses,
- determine, on a basis of the image forming apparatus location information and the stock manager server location information, one stock manager server apparatus having a smallest distance from the image forming apparatus, and
- send, to the determined stock manager server apparatus, an order request to order the consumable product.

8. A non-volatile computer readable recording medium that records an information processing program executable by a controller circuit of an ordering server apparatus physically distant from an image forming apparatus using a consumable product and the one or more stock manager server apparatuses physically distant from the image forming apparatus, and communicatively connected to the image forming apparatus and the one or more stock manager server apparatuses via a network,
the ordering server apparatus being configured to send communication to one of the one or more stock manager server apparatuses depending on a remaining amount of the consumable product in use in the image forming apparatus,
each of the one or more stock manager server apparatuses being used by a distributor that distributes the consumable product, and being configured to receive the communication from the ordering server apparatus and manage stock of the consumable product,
each location of the one or more stock manager server apparatuses being different from each other and unknown by the image forming apparatus,
each distance to each of the one or more stock manager server apparatuses from the image forming apparatus being different from each other and unknown by the image forming apparatus,
the information processing program causing the controller circuit of the ordering server apparatus to
- receive remaining amount information from the image forming apparatus, the remaining amount information indicating a remaining amount of the consumable product in use in the image forming apparatus, determine to order a consumable product to be used in the image forming apparatus on a basis of the remaining amount information, obtain image forming apparatus location information, the image forming apparatus location information indicating location information of the image forming apparatus, obtain stock manager server location information, the stock manager server location information indicating location information of each of the one or more stock manager server apparatuses, determine, on a basis of the image forming apparatus location information and the stock manager server location information, one stock manager server apparatus having a smallest distance from the image forming apparatus, and send, to the determined stock manager server apparatus, an order request to order the consumable product.

\* \* \* \* \*